US009111561B1

(12) United States Patent
Contreras et al.

(10) Patent No.: US 9,111,561 B1
(45) Date of Patent: Aug. 18, 2015

(54) MAGNETIC RECORDING DISK DRIVE WITH WRITE CURRENT OVERSHOOT AMPLITUDE (OSA) RESPONSIVE TO DATA TRANSITIONS

(71) Applicant: HGST Netherlands B.V., Amsterdam (NL)

(72) Inventors: John Contreras, Palo Alto, CA (US); Samir Y. Garzon, Sunnyvale, CA (US); Weldon Mark Hanson, Rochester, MN (US); Rehan Ahmed Zakai, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/526,336

(22) Filed: Oct. 28, 2014

(51) Int. Cl.
G11B 5/03 (2006.01)
G11B 5/596 (2006.01)

(52) U.S. Cl.
CPC .................................. *G11B 5/59616* (2013.01)

(58) Field of Classification Search
None
See application file for complete search history.

(56) References Cited

U.S. PATENT DOCUMENTS

| | | | | |
|---|---|---|---|---|
| 3,938,050 A | * | 2/1976 | Corbett et al. | 327/317 |
| 4,510,536 A | * | 4/1985 | Tabata et al. | 360/65 |
| 4,556,869 A | * | 12/1985 | Thomson | 341/70 |
| 5,801,896 A | * | 9/1998 | Freitas | 360/77.08 |
| 6,381,086 B1 | * | 4/2002 | Koenig et al. | 360/68 |
| 6,826,003 B1 | | 11/2004 | Subrahmanyam | |
| 7,830,631 B2 | | 11/2010 | Nakagawa et al. | |
| 8,565,048 B1 | * | 10/2013 | Wilson et al. | 369/13.26 |
| 8,669,784 B1 | * | 3/2014 | Wu | 326/93 |
| 8,724,244 B1 | * | 5/2014 | Poss et al. | 360/46 |
| 8,929,013 B1 | * | 1/2015 | Mastrocola et al. | 360/46 |
| 2005/0190476 A1 | * | 9/2005 | Wilson et al. | 360/46 |
| 2008/0043358 A1 | * | 2/2008 | Nakagawa et al. | 360/46 |
| 2008/0266696 A1 | * | 10/2008 | Dina et al. | 360/55 |
| 2009/0284860 A1 | * | 11/2009 | Takeuchi | 360/69 |
| 2010/0079912 A1 | * | 4/2010 | Hama et al. | 360/118 |
| 2010/0246048 A1 | * | 9/2010 | Ranmuthu | 360/68 |
| 2011/0228871 A1 | * | 9/2011 | Lutz | 375/295 |
| 2013/0128375 A1 | | 5/2013 | Livshitz et al. | |
| 2013/0308222 A1 | * | 11/2013 | Dina et al. | 360/55 |
| 2014/0126077 A1 | * | 5/2014 | Contreras et al. | 360/46 |

FOREIGN PATENT DOCUMENTS

FR 2800883 A1 * 5/2001 ............... G05F 1/56

* cited by examiner

*Primary Examiner* — Peter Vincent Agustin
(74) *Attorney, Agent, or Firm* — Thomas R. Berthold

(57) ABSTRACT

A disk drive dynamic wave shaper (DWS) write driver includes a write current generator that produces a baseline output current for the write current pulses and an overshoot current generator that produces an overshoot current with different values. The overshoot current is added to the baseline current, with the value of the overshoot current amplitude (OSA) being selected in response to the frequency of transitions in the write data signal. The write driver includes logic circuitry that detects the pattern of transitions. Transitions that are immediately followed by a transition will receive a larger-than-nominal OSA1, transitions that are not immediately followed by a transition and that are not preceded by a long sequence of non-transitions will receive a nominal OSA2, and transitions after longer sequences of non-transitions will receive a smaller-than-nominal OSA3.

15 Claims, 5 Drawing Sheets

MAGNETIC RECORDING DISK DRIVE WITH WRITE CURRENT OVERSHOOT AMPLITUDE (OSA) RESPONSIVE TO DATA TRANSITIONS

BACKGROUND OF THE INVENTION

1. Field of the Invention

The invention relates generally to magnetic recording hard disk drives (HDDs), and more particularly to an HDD that optimizes the analog write current pulses in response to the frequency of the transitions in the data to be written to the disk.

2. Description of the Related Art

HDDs typically include a main integrated circuit, which is typically a system-on-a-chip (SOC) that contains many of the electronics and firmware for the HDD. The SOC receives the digital data to be written to the disk and transfers it to the read pre-amplifier/write driver integrated circuit (preamp IC). The preamp IC is typically located on the arm of the actuator that moves the read/write heads to the selected data tracks on the disks. The data to be written by the write head is sent from the SOC to the preamp IC, where the write driver generates analog write current pulses that are applied to the inductive coil in the write head to write data by selectively magnetizing the magnetic media of the recording layer on the disk. Registers in the preamp IC can be set to adjust the baseline write current magnitude (Iw) and the overshoot amplitude (OSA) of the write pulses.

Certain data bit patterns present difficulties for generation of the proper write current pulses. Closely-spaced transitions, such as transitions in consecutive clock cycles, require a larger-than-nominal OSA to generate adequate flux to saturate the media. Data patterns with long sequences of non-transitions (consecutive data 0's or consecutive data 1's) require a smaller-than-nominal OSA to prevent or minimize far track erasure (FTE). FTE arises because the write field from the write head is wider than a data track so when the write head is writing to a track, the outer portions of the write field (called the fringe field) overlap onto tracks other than the track being written. Data degradation due to fringe fields can extend over a range of tracks relatively far from the track being written. FTE is most likely due to domain walls that form in the magnetic shields and return pole of the write head. It has been determined that FTE is introduced if the OSA is too large for long sequences of non-transitions. FIG. 1 is a schematic illustrating FTE.

What is needed is a HDD with a write driver that can generate various levels of OSA to optimize the write current pulses for closely-spaced transitions and long sequences of non-transitions.

SUMMARY OF THE INVENTION

Embodiments of the invention relate to a disk drive dynamic wave shaper (DWS) write driver that includes a write current generator that produces a baseline output current for the write current pulses and an overshoot current generator that produces an overshoot current with different values. The overshoot current is added to the baseline current, with the value of the overshoot current amplitude (OSA) being selected in response to the frequency of transitions in the write data signal. The write driver includes logic circuitry that detects the pattern of transitions. Transitions that are immediately followed by a transition will receive a larger-than-nominal OSA1, transitions that are not immediately followed by a transition and that are not preceded by a long sequence of non-transitions will receive a nominal OSA2, and transitions after longer sequences of non-transitions will receive a smaller-than-nominal OSA3. This enables a large OSA value to generate enough flux to saturate the media for closely-spaced transitions, and a small OSA value to prevent or minimize FTE for long sequences of non-transitions.

For a fuller understanding of the nature and advantages of the present invention, reference should be made to the following detailed description taken together with the accompanying figures.

DETAILED DESCRIPTION OF THE INVENTION

Figure 1:
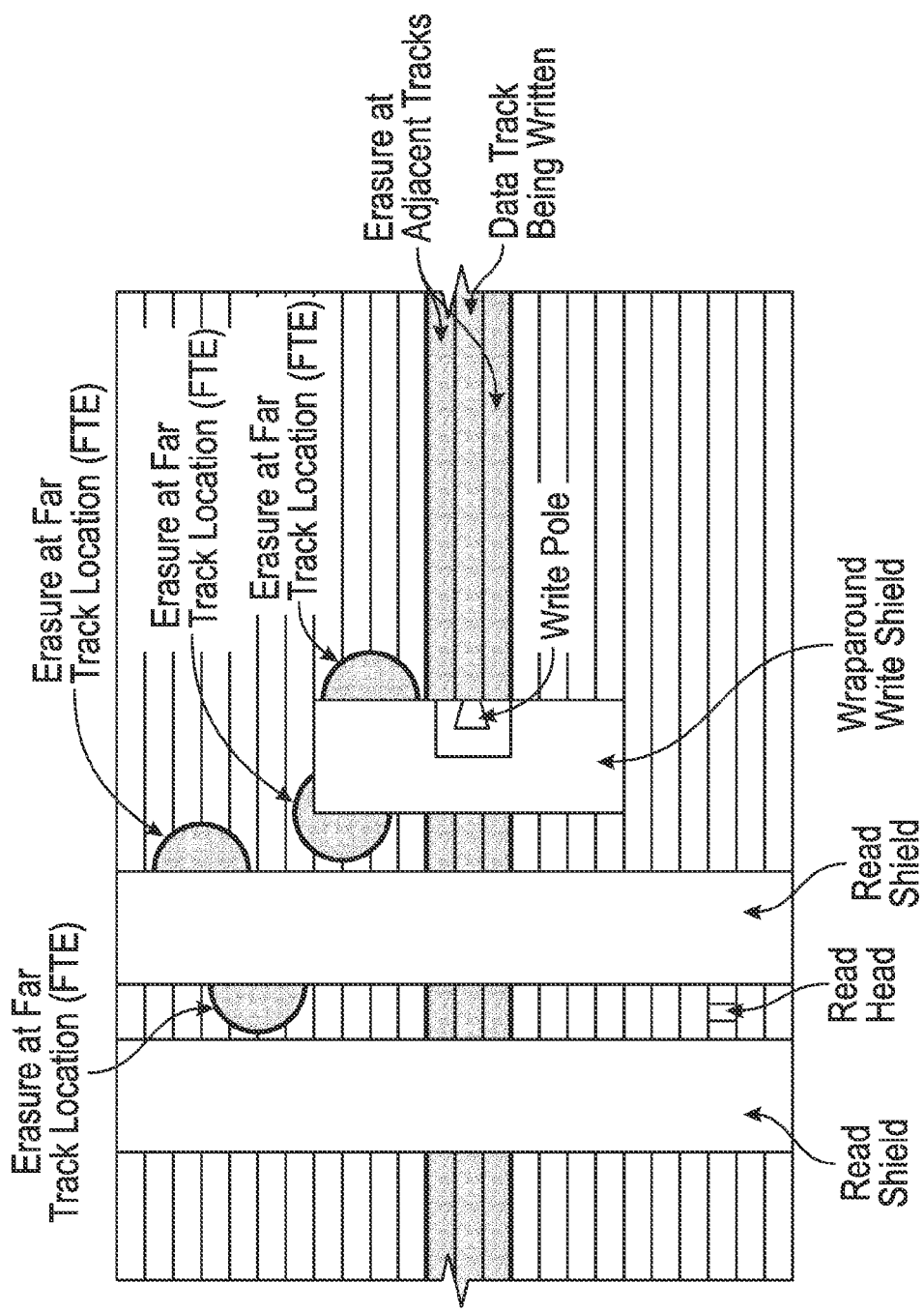
FIG. 1 is a schematic illustrating the problem of far track erasure (FTE).
Figure 2:
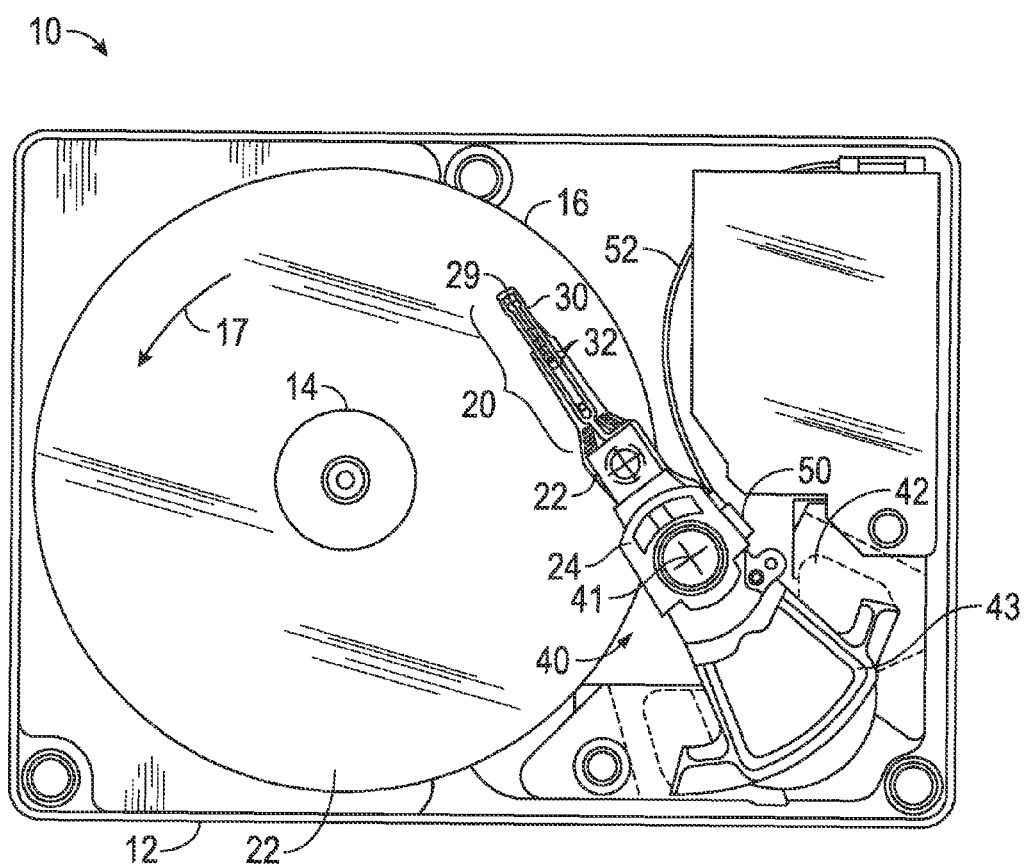
FIG. 2 is a top plan view of a head/disk assembly (HDA) of a magnetic recording hard disk drive.

FIG. 2 is a top plan view of a head/disk assembly (HDA) of a hard disk drive 10 that may include embodiments of the invention. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. Disk drive 10 also includes a rotary actuator assembly 40 rotationally mounted to the base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the heads 29 to the data tracks on the disks. Each load beam assembly 20 has an integrated lead suspension (ILS) 30 with an array of electrically conductive lines or traces 32 that connect to a read/write head 29. The traces 32 connect at one end to the read/write head 29 and at the other end through a short flex cable to a read preamplifier/write driver integrated circuit (preamp IC) 50 secured to a side of the E-block 24. The preamp IC 50 receives write data input signals from the disk drive's system-on-a-chip (SOC) (not shown) that is typically located on the back side of base 12. The SOC is connected to preamp IC 50 by a flex cable 52.

Figure 3:
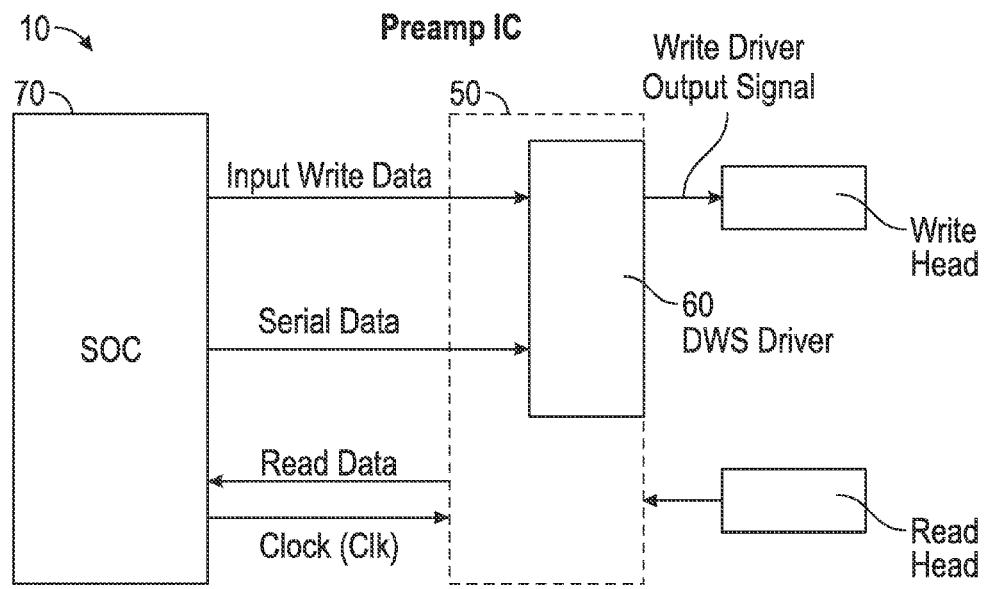
FIG. 3 is a block diagram illustrating selected components of a disk drive with a read/write (R/W) preamp IC that includes a dynamic wave shaping (DWS) write driver according to an embodiment of the invention.

FIG. 3 is a block diagram illustrating selected components of disk drive 10 with a read/write (R/W) preamp IC 50 that includes a dynamic wave shaping (DWS) write driver 60 according to an embodiment of the invention. The preamp IC 50 will typically have one preamp port for each of the heads included in the disk drive, where the multiple read and write ports are connected to a circuit multiplexer that selects the programmed active port. The preamp IC 50 sends and receives data signals to/from the system-on-a-chip (SOC) 70 using standard communication techniques used in a disk drive. The SOC 70 sends the digital write data to the preamp IC 50. The SOC 70 also sends a clock (clk) signal to the preamp IC 50, which in this illustration is shown as being multiplexed on the read data path. The SOC 70 may also send serial data to the preamp IC 50 that is used to set registers (not shown) with values for parameters that control the functions of the preamp IC 50. The DWS write driver 60 receives the digital write data signal and generates analog write current pulses to the write head.

Figure 4:
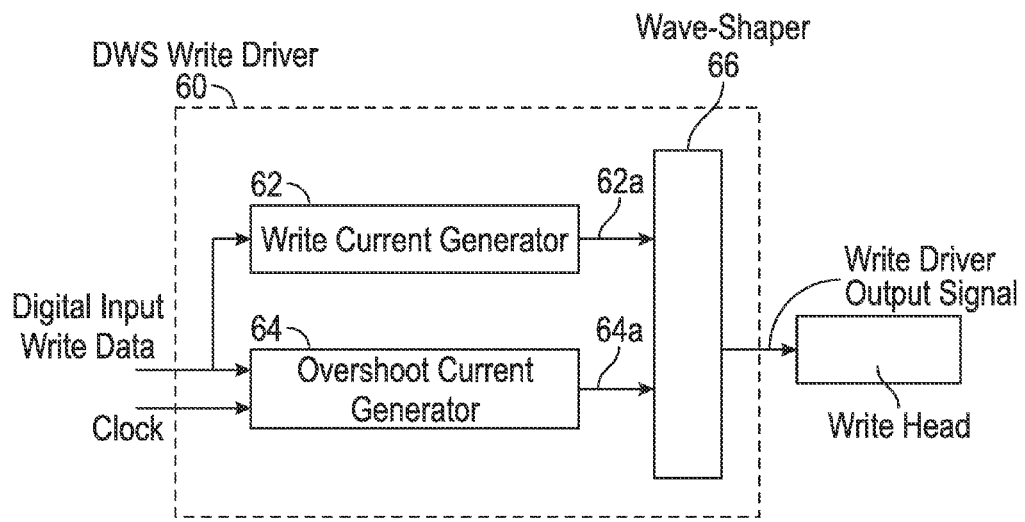
FIG. 4 is a block diagram illustrating selected components of the DWS write driver according to an embodiment of the invention.

FIG. 4 is a block diagram illustrating selected components of the DWS write driver 60 according to an embodiment of the invention. The DWS write driver 60 includes a write current generator 62 and an overshoot current generator 64. Registers (not shown) in the DWS write driver 60 that are set using serial data from the SOC 70 affect the function of the current generators 62, 64. The write current generator 62 receives the digital write data signal and generates the analog baseline current Iw on line 62a with an amplitude according to a parameter set in a register (not shown), in the manner as known in the prior art. The overshoot current generator 64 receives the digital write data signal and clock signal and generates an analog overshoot current on line 64a with an amplitude that is dependent on the sequence of transitions in the input digital write data, in the manner to be described below. The wave shaper 66 adds the baseline current with the overshoot current and generates the complete write driver analog output pulses with the appropriate sign to the inductive coil of the write head.

Embodiments of the invention use an overshoot current generator that selects one of a multiple number of overshoot amplitude (OSA) levels in response to the frequency of transitions in the digital input write data stream. The operation of the overshoot current generator will be explained with the logic diagram of FIG. 5 and the timing diagram of FIG. 6.

Figure 6:
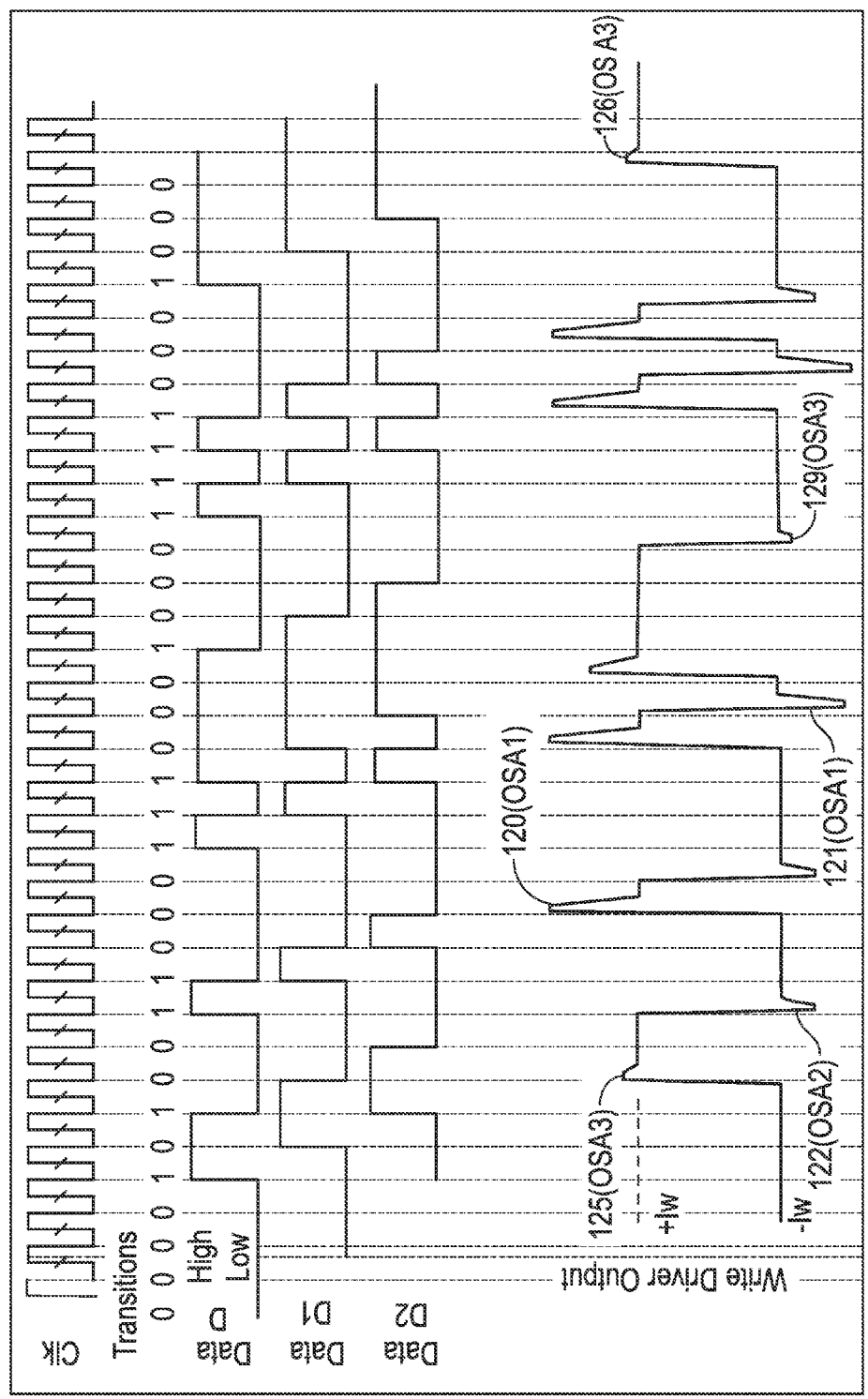
FIG. 6 is a timing diagram illustrating the overshoot current generator logic according to an embodiment of the invention.

The SOC generates a clock (clk) signal that is sent to the preamp IC 50, where the frequency can be doubled to get one positive and one negative transition within each bit period, as shown at the top of the FIG. 6 timing diagram. Allowing a lower frequency transmission from the SOC to the preamp IC aids in lowering the bandwidth transmission requirement. This clock signal can be multiplexed through the read path, as shown in FIG. 3. The logic can be determined by past measurements of the write current overshoot requirements, which in this embodiment can be in one of two classes: 1) 1T look-ahead (1TLA); or 2) look-back, where 1T is the time duration of the shortest bit. The look-back can be subdivided further into subclasses: 2a) short look-back (N1TLB); and 2b) long look-back (N2TLB). Therefore, a simplified logic can be created for two classes and two look-back subclasses.

Figure 5:
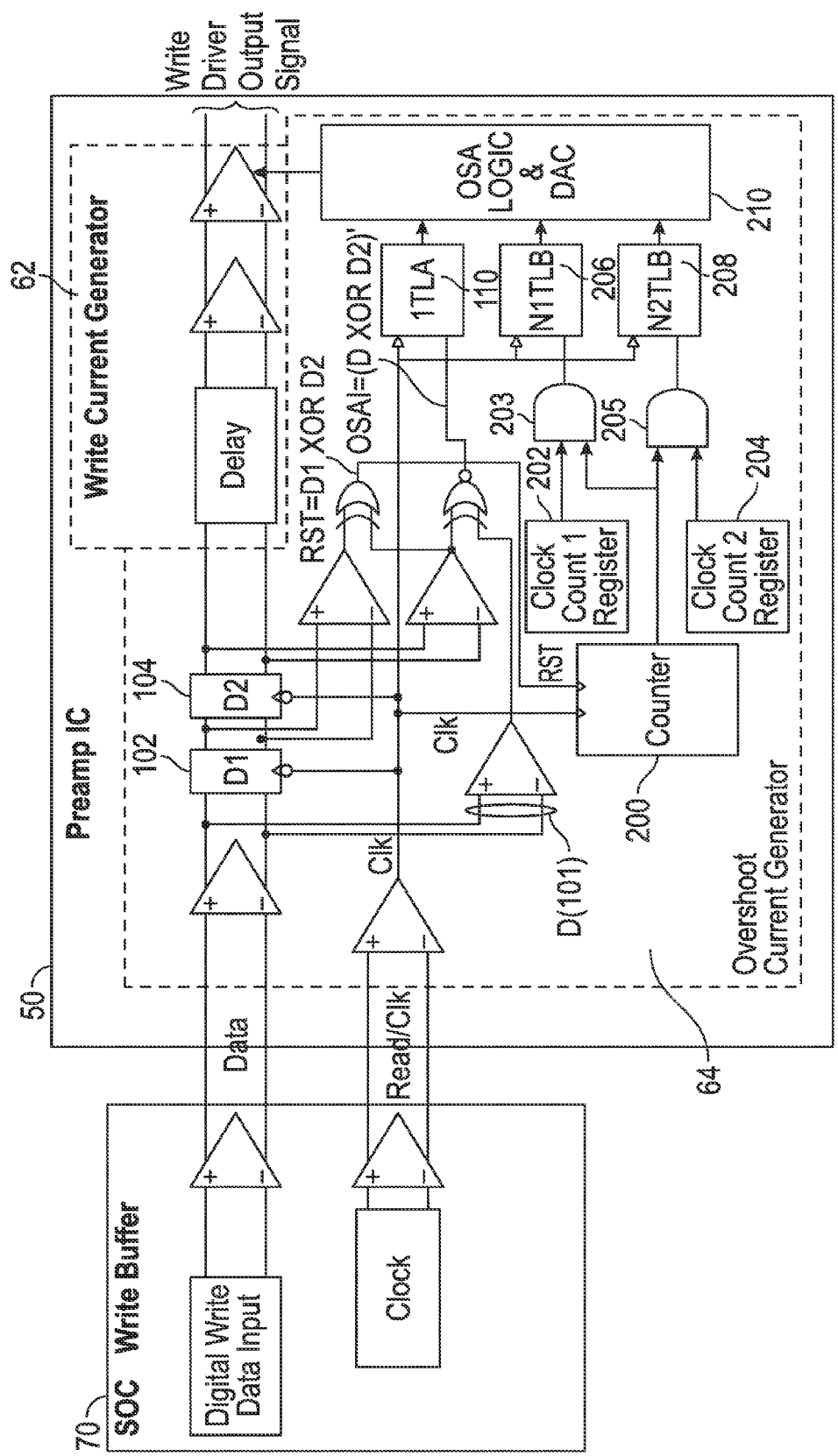
FIG. 5 is a block diagram of the write driver illustrating the overshoot current generator logic according to an embodiment of the invention.

FIG. 5 shows the block diagram for the DWS architecture and logic implementation. FIG. 6 shows the associated signals for the different parts of the DWS architecture, where the analog write driver output pulses are shown at the bottom, where the write current generator generates the baseline current +/−Iw, and the overshoot current generator generates three different levels of OSA. As is typical in disk drive systems, the data signal recording process uses a non-return to zero (NRZ), where a 1 represents a transition and a 0 represents a non-transition synchronized with the clock signal, as shown in the first (Clk) and third line (Data, D) of FIG. 6. In this timing diagram, the D value is the buffered input data and the D1, D2 values are the data values sequenced in time by the clock trigger input that reproduces the delayed high and low values of the data, and these delayed signals are used to set the OSA1 level for the minimum bit spacing (1T). In conjunction with the signals (D 101, D1 102, and D2 104), the clock counter 200 is used and compared at comparator 203 with Clock Count Register 1 (CCR1) 202 and at comparator 205 with Clock Count Register 2 (CCR2) 204 to set additional OSA levels. The three OSA levels are defined by the different parts of the logic: OSA1 defined by 1TLA logic, and OSA2 and OSA3 defined by CCR1 and N1TLB logic, with OSA2 being considered the nominal default value. For OSA1, the 1TLA delay gate look ahead block 110 input is determined by the logic expression OSA1=(D XOR D2)', and the value is 1 when the D and D2 states are both equal (low or high). A coincident interstitial data transition, 1, timed between D and D2, then can utilize the 1TLA 110 output to set the appropriate OSA1 level, which is much larger than the nominal value, OSA2. For OSA2, transition counts less than the preprogrammed value for CCR1 202 utilize the N1-count look-back (N1TLB) block 206, and once the CCR1 value equals the counter 200 the N1TLB 206 latches a high value indicating that the counter 200 value is now equal to or greater than the CCR1 202 value. The CCR1 202 value will always be greater than or equal to 1T. For OSA3, transition counts equal to or greater than the value for CCR1 202 will then determine the application of OSA3, which is a lower value than the nominal OSA2 value. Therefore, the OSA3 value is the OSA level for the longest time between transitions. For this implementation, 1TLA logic "true" would have priority over OSA2 and OSA3, as shown in the last line, Write Driver Output, of the timing diagram in FIG. 6. Similarly, additional OSA levels may also be applied by utilizing the N2-count look-back (N2TLB) block 208, and once the CCR2 204 value equals the counter 200 the N1TLB 208 latches a high value indicating that the counter 200 value is now equal to or greater than the CCR2 204 value. For the description of this embodiment, the CCR2 204 is not used, but can be utilized for additional OSA levels.

For both the N1TLB and N2TLB, the count values for CCR1 202 and CCR2 204 can be programmed into the logic though the serial path from the SOC (FIG. 3). A write transition resets (RST) the counter and initiates the counting of clock cycles, with the logic expression RST=D1 XOR D2. The look-back logic thus determines the conditions for OSA2 and OSA3 when an upcoming transition follows a preselected number of clock cycles without a transition, i.e., a preselected number of non-transitions (consecutive data 0's or consecutive data 1's). FIG. 6 shows a larger than nominal overshoot with OSA1, when transition times are equal to the minimum 1T spacing for both positive OSA1 120 and negative OSA1 121 transitions. For nominal overshoots, negative OSA2 122 occurs for less than three consecutive non-transitions; and the positive case is not shown. This would occur for example, when CCR1 202 was set for the value 3. For smaller than nominal overshoots, positive OSA3 125 and 126 occur for greater than two consecutive non-transitions, and for negative transition shown as 129. This would occur for example, when OSA3 logic utilize CCR1 202 set for a value equal or greater than 3. Another example not shown could define a fourth level of overshoot by utilizing CCR2 204. The two look-back registers are depicted in FIG. 5, but it is within the scope of the invention to have only one register or more than two registers, in which case additional levels of OSA values could be used for different time lengths of between transitions. The OSA logic/digital-to-analog converter (DAC) 210 selects the appropriate OSA and generates the analog overshoot current that is added to the analog baseline current from write current generator 62.

Thus, as described above, transitions that are immediately followed by a transition will receive a larger-than-nominal OSA1, transitions that are not immediately followed by a transition and that are not preceded by a long sequence of non-transitions will receive a nominal OSA2, and transitions after longer sequences of non-transitions will receive a smaller-than-nominal OSA3. This enables a large OSA value to generate enough flux to saturate the media for closely-spaced transitions, and a small OSA value to prevent or minimize FTE for long sequences of non-transitions. The logic in the preamp IC depicted in FIG. 5 and shown by the timing diagram of FIG. 6 is one of many possible implementations that can use delay blocks in the digital input write data stream to select one of a multiple number of OSAs.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk drive preamplifier comprising:
   a write driver that receives a clock signal and a digital write data input signal and generates analog write current pulses corresponding to transitions in the digital write data input signal, the write driver including:
   a write current generator that produces a baseline output current for the write current pulses; and
   an overshoot current generator that produces an overshoot current that is added to the baseline current, the overshoot current generator including logic circuitry that generates, from the digital write data input signal, a first overshoot signal in response to a transition with no immediately successive transition, a second overshoot signal greater than said first overshoot signal in response to consecutive transitions, and a third overshoot signal less than said first overshoot signal in response to a predetermined number of non-transitions.

2. The preamplifier of claim 1 wherein the logic circuitry includes a one-clock-cycle delay register having a value D1 and a two-clock-cycle delay register having a value D2 for the digital write data input signal.

3. The preamplifier of claim 2 wherein the logic circuitry receives, from the digital write data input signal, an input data bit having a value D and detects consecutive transitions according to the logic expression (D XOR D2)'.

4. The preamplifier of claim 1 wherein the logic circuitry includes a clock-cycle counter initiated by a transition and a clock-count register having a predetermined count value, and wherein the logic circuitry generates said third overshoot signal when the clock-cycle counter equals the clock-count in said register.

5. The preamplifier of claim 4 wherein the logic circuitry includes a one-clock-cycle delay register having a value D1 and a two-clock-cycle delay register having a value D2 for the digital write data input signal, and wherein the clock-cycle counter is initiated from the logic expression (D1 XOR D2).

6. A magnetic recording disk drive comprising:
   system electronics that supplies a clock signal and a digital write data input signal;
   a write driver that receives a clock signal and the digital write data input signal and generates analog write current pulses corresponding to transitions in the digital write data input signal, the write driver including:
   a write current generator that produces a baseline output current for the write current pulses; and
   an overshoot current generator that produces an overshoot current that is added to the baseline current, the overshoot current generator including logic circuitry that generates, from the digital write data input signal, a first overshoot signal in response to a transition with no immediately successive transition, a second overshoot signal greater than said first overshoot signal in response to consecutive transitions, and a third overshoot signal less than said first overshoot signal in response to a predetermined number of consecutive non-transitions; and
   a write head including an inductive coil that receives the write current pulses from the write driver.

7. The disk drive of claim 6 wherein the logic circuitry includes a one-clock-cycle delay register having a value D1 and a two-clock-cycle delay register having a value D2 for the digital write data input signal.

8. The disk drive of claim 7 wherein the logic circuitry receives, from the digital write data input signal, an input data bit having a value D and detects consecutive transitions according to the logic expression (D XOR D2)'.

9. The disk drive of claim 7 wherein the logic circuitry includes a clock-cycle counter initiated by a transition and a clock-count register having a predetermined count value, wherein the logic circuitry generates said third overshoot signal when the clock-cycle counter equals the clock-count in said register, and wherein the clock-cycle counter is initiated from the logic expression (D1 XOR D2).

10. The disk drive of claim 9 wherein the system electronics supplies serial data to the write driver, and wherein said predetermined count value in said clock-count register is programmed into said register from the system electronics.

11. A disk drive preamplifier comprising:
    a write driver that receives a clock signal and a digital write data input signal and generates analog write current pulses corresponding to transitions in the digital write data input signal, the write driver including:
    a write current generator that produces a baseline output current for the write current pulses; and
    an overshoot current generator that produces an overshoot current that is added to the baseline current, the overshoot current generator including logic circuitry that generates, from the digital write data input signal, a first overshoot signal in response to a transition with no immediately successive transition, and a second overshoot signal greater than said first overshoot signal in response to consecutive transitions; wherein the logic circuitry includes a one-clock-cycle delay register having a value D1 and a two-clock-cycle delay register having a value D2 for the digital write data input signal.

12. The preamplifier of claim 11 wherein the logic circuitry receives, from the digital write data input signal, an input data bit having a value D and detects consecutive transitions according to the logic expression (D XOR D2)'.

13. The preamplifier of claim 11 wherein the logic circuitry generates a third overshoot signal less than said first overshoot signal in response to a predetermined number of non-transitions.

14. The preamplifier of claim 13 wherein the logic circuitry includes a clock-cycle counter initiated by a transition and a clock-count register having a predetermined count value, and wherein the logic circuitry generates said third overshoot signal when the clock-cycle counter equals the clock-count in said register.

15. The preamplifier of claim 14 wherein the logic circuitry includes a one-clock-cycle delay register having a value D1 and a two-clock-cycle delay register having a value D2 for the digital write data input signal, and wherein the clock-cycle counter is initiated from the logic expression (D1 XOR D2).

* * * * *